United States Patent
Anetzberger

(10) Patent No.: US 11,511,793 B2
(45) Date of Patent: Nov. 29, 2022

(54) STEERING AXLE FOR AN INDUSTRIAL TRUCK, AND INDUSTRIAL TRUCK HAVING THE STEERING AXLE

(71) Applicant: ZF Friedrichshafen AG, Friedrichshafen (DE)

(72) Inventor: Michael Anetzberger, Waldkirchen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 94 days.

(21) Appl. No.: 16/908,791

(22) Filed: Jun. 23, 2020

(65) Prior Publication Data
US 2020/0406960 A1     Dec. 31, 2020

(30) Foreign Application Priority Data

Jun. 27, 2019 (DE) .................... 10 2019 209 351.5

(51) Int. Cl.
*B62D 5/04* (2006.01)
*F16H 25/20* (2006.01)
*B66F 9/075* (2006.01)

(52) U.S. Cl.
CPC ......... *B62D 5/0424* (2013.01); *B62D 5/0448* (2013.01); *B66F 9/07568* (2013.01); *F16H 25/20* (2013.01); *F16H 2025/2081* (2013.01)

(58) Field of Classification Search
CPC .. B62D 5/0424; B62D 5/0448; B62D 5/0421; B62D 5/0445; B62D 5/0463; B62D 3/06;
(Continued)

(56) References Cited

U.S. PATENT DOCUMENTS 6,039,143 A * 3/2000 Kielar .................. B62D 5/0421
                                                        180/253
6,098,742 A * 8/2000 Cartwright ............... B62D 3/06
                                                        180/429
(Continued)

FOREIGN PATENT DOCUMENTS

DE    10 2009 002 934 A1    11/2010
DE    10 2016 201 100 A1     7/2017
(Continued)

OTHER PUBLICATIONS

German Search Report Corresponding to 10 2019 209 351.5 dated Jan. 8, 2020.

*Primary Examiner* — Jacob D Knutson
*Assistant Examiner* — Abigail R Hymel
(74) *Attorney, Agent, or Firm* — Finch & Maloney PLLC

(57) ABSTRACT

A steering axle for steering the wheels on the axle of a four-wheel forklift truck by a hydraulic or electric steering device. The steering axle has an axle beam with first and second wheel carriers. The wheel carriers are arranged pivotably on the axle beam. A steering rod is connected, in articulated fashion, to the two wheel carriers in order to transmit steering movements. A steering actuator produces the steering movement and has an actuator housing. The actuator housing has at least one guide section for the passage of the steering rod through the actuator housing. The steering actuator has at least one sliding bearing device for the radial support of the steering rod on the at least one guide section.

11 Claims, 2 Drawing Sheets

(58) Field of Classification Search
CPC ....... B62D 7/10; B66F 9/07568; F16H 25/20; F16H 2025/2081; F16C 29/02; F16C 33/043; F16C 2326/24; B60Y 2200/15; B60B 35/163; B60B 35/122
See application file for complete search history.

(56) References Cited

U.S. PATENT DOCUMENTS

| | | | |
|---|---|---|---|
| 2018/0290488 A1* | 10/2018 | Kaplan | B60B 35/003 |
| 2018/0345786 A1* | 12/2018 | Kucharski | B60K 1/00 |
| 2019/0016372 A1* | 1/2019 | Kimura | B62D 5/0424 |
| 2019/0063584 A1* | 2/2019 | Annigeri | F16H 48/42 |
| 2019/0118854 A1* | 4/2019 | Tate | F16H 25/2252 |
| 2019/0248203 A1 | 8/2019 | Krehmer et al. | |

FOREIGN PATENT DOCUMENTS

| | | |
|---|---|---|
| DE | 10 2016 204 566 A1 | 9/2017 |
| DE | 10 2016 211 965 A1 | 1/2018 |
| DE | 10 2016 221 206 A1 | 5/2018 |
| DE | 10 2017 209 681 A1 | 12/2018 |
| DE | 10 2017 219 309 A1 | 5/2019 |
| WO | 2016/150625 A1 | 9/2016 |

* cited by examiner

STEERING AXLE FOR AN INDUSTRIAL TRUCK, AND INDUSTRIAL TRUCK HAVING THE STEERING AXLE This application claims priority from German patent application serial no. 10 2019 209 351.5 filed Jun. 27, 2019.

FIELD OF THE INVENTION

The invention relates to a steering axle for an industrial truck. Moreover, the invention relates to an industrial truck having the steering axle.

BACKGROUND OF THE INVENTION

There is a known practice of steering the wheels on an axle of four-wheel forklift trucks by means of a hydraulic or electric steering device. In this case, the wheels are coupled to one another in terms of motion via a steering rod, wherein steering movement is transmitted to the steering rod via the steering device, e.g. a steering actuator. For this purpose, the steering rod is usually arranged at least partially in a housing of the steering actuator and is connected to the latter in terms of drive.

Document DE 10 2009 002 934 A1, which is probably the closest prior art, discloses a steerable vehicle axle for a commercial vehicle having an axle beam, at each of the ends of which an axle head that can be steered via a track rod is mounted, wherein the track rod can be moved by means of at least one drive, wherein at least one electric motor having at least one transmission is provided as the drive, thus enabling the electric motor to be arranged offset or at a predetermined angle relative to the track rod.

SUMMARY OF THE INVENTION

The problem addressed by the invention is that of creating a steering axle of the type stated at the outset which is distinguished by a robust configuration. Another problem addressed by the invention is that of proposing an industrial truck having the steering axle.

According to the invention, this problem is solved by a steering axle having the features of the independent claim(s) and by an industrial truck having the features of the independent claim(s). Advantageous configurations will become apparent from the dependent claims, the drawings and/or the description.

The invention relates to a steering axle which is designed and/or suitable for an industrial truck. In particular, the steering axle is designed as a steered front or rear axle of the industrial truck. As an option, the steering axle can be designed as a driven axle, wherein a driving torque of a driving machine, e.g. an internal combustion engine and/or electric motor, of the industrial truck can be transmitted and/or is transmitted to the vehicle wheels of the steering axle. More specifically, the steering axle can be designed as a swing axle.

The steering axle comprises an axle beam, which defines a main axis. In particular, the main axis is defined by a longitudinal axis of the axle beam. In particular, the axle beam forms the rigid part of the steering axle, which is connected to a frame of the industrial truck. For this purpose, the axle beam can have a central fastening section for fastening the axle beam on the frame, for example. For example, the fastening section is and/or can be connected detachably to the frame by means of a screwed joint.

The steering axle has a first and a second wheel carrier, wherein the first and the second wheel carrier are arranged pivotably on the axle beam. In particular, the two wheel carriers serve to receive respective vehicle wheels. The two wheel carriers are preferably mounted pivotably on the axle beam by means of respective pivot joints. As a particular preference, the two wheel carriers are each arranged at one axial end of the axle beam in relation to the main axis.

The steering axle has a steering rod, wherein the steering rod is connected in articulated fashion to the two wheel carriers in order to transmit a steering movement. In particular, the two wheel carriers are each attached to one end of the steering rod by means of a steering arm. In principle, the steering rod can be mechanically coupled to a steering wheel of the industrial truck in order to transmit the steering movement. However, the steering movement is preferably transmitted electronically or hydraulically from the steering wheel to the track rod. It is thereby possible to implement a "steer-by-wire" steering system without any mechanical connection to the steering wheel. In particular, the steering rod and the axle beam are arranged coaxially and/or concentrically with one another in relation to the main axis.

The steering axle has a steering actuator, which is designed and/or is suitable for producing the steering movement. In principle, the steering actuator can be designed as a hydraulic steering drive or preferably as an electrically actuable steering drive. The steering actuator has an actuator housing. In particular, the steering rod is arranged and/or can be arranged at least partially in the actuator housing in such a way that the steering actuator is coupled and/or can be coupled to the steering rod in terms of drive. In particular, the steering rod can be moved in an axial direction with respect to the main axis, relative to the actuator housing, in order to implement the steering movement, wherein the actuator housing remains fixed on the axle beam.

The actuator housing has at least one or precisely one guide section, which is designed and/or is suitable for passing the steering rod through the actuator housing. The steering rod is preferably guided into the actuator housing in the axial direction in relation to the main axis by means of the guide section. The at least one guide section is preferably designed as an elongate and/or cylindrical opening which passes through the actuator housing in the axial direction in relation to the main axis. In principle, the steering rod can be guided into the actuator housing by means of precisely one guide section. However, the actuator housing preferably has precisely two guide sections, wherein the steering rod is guided into and out of the actuator housing in the axial direction in relation to the main axis by means of the two guide sections. The two guide sections are preferably arranged coaxially with one another in relation to the main axis.

In the context of the invention, it is proposed that the steering actuator has at least one or precisely one sliding bearing device, which is designed and/or is suitable for the radial support of the steering rod on the at least one or precisely one guide section. In particular, the sliding bearing device has the function of guiding transverse forces acting on the steering rod into the actuator housing and, at the same time, ensuring axial guidance of the steering rod by means of sliding bearing support. The sliding bearing support is preferably implemented by means of solid body friction, also referred to as dry friction. For this purpose, the sliding bearing device is preferably manufactured from a low-friction, in particular self-lubricating, material. For example, the sliding bearing device can comprise a lead and/or tin and/or copper and/or brass and/or aluminium alloy. As an alternative, the sliding bearing device can be manufactured from an industrial ceramic or can be coated therewith. As an option, provision can be made for the sliding bearing device to be at least partially hardened or fully hardened. More specifically, the steering actuator can have two of the sliding bearing devices, wherein each sliding bearing device is assigned to or arranged in a respective guide section.

The advantage of the invention consists, in particular, in that, by means of the sliding bearing device, transverse force support is implemented for the steering rod, on the one hand allowing transverse forces acting on the steering rod to be introduced into the actuator housing and, on the other hand, reducing or preventing deformation of the steering rod. Thus, a steering axle is proposed which is distinguished by a particularly robust configuration. Through the use of the sliding bearing device, it is furthermore possible to ensure steering operation, especially in the case of high transverse forces, since the steering rod can furthermore be moved smoothly in the axial direction by virtue of the sliding bearing support. Thus, the operational reliability and life of the steering actuator can be improved since the forces that have to be applied to implement the steering movement can be significantly reduced.

In a preferred configuration of the invention, the sliding bearing device is designed as a slide bush. The slide bush preferably forms a contour which matches that of the steering rod. In particular, the slide bush has a cylindrical shape. As a particular preference, the slide bush is designed as a cylindrical sleeve. More specifically, the slide bush has an elongate, in particular tubular, structural shape, wherein an axial overall length of the slide bush is preferably greater than a diameter of the slide bush. In relation to the main axis, the slide bush is arranged coaxially and/or concentrically in the guide section. The slide bush preferably rests in the radial direction over an area, in particular over the full area, of a radial outer side against a radially inner side of the guide section.

It is thus one consideration of the invention to propose a sliding bearing device which is distinguished by a particularly simple and low-cost configuration.

In another preferred embodiment of the invention, it is envisaged that the sliding bearing device is arranged in the guide section in a manner secure against loss by means of a positive joint. In particular, the sliding bearing device is supported positively on the guide section in the radial and/or axial direction in relation to the main axis. Alternatively or as an optional additional measure, the sliding bearing device is arranged in the guide section in a manner secure against loss by means of a non-positive joint. The sliding bearing device is preferably arranged in the guide section by means of an interference fit. The sliding bearing device is preferably pressed into the guide section.

Thus, the sliding bearing device proposed is one which can be installed in the guide section in a particularly simple and rapid manner. Moreover, it is ensured that the sliding bearing device is held firmly in the guide section.

In a preferred specific embodiment, it is envisaged that the steering rod has an axial overall length, wherein at least or precisely 10% of the axial overall length of the steering rod is supported by the sliding bearing device. In particular, more than 10%, preferably more than 20%, more specifically more than 30%, of the axial overall length of the steering rod is supported by the sliding bearing device. Alternatively or as an optional additional measure, less than 40%, preferably less than 25%, more specifically less than 15%, of the axial overall length of the steering rod is supported by the sliding bearing device. As a particular preference, the sliding bearing device, in particular the slide bush, has an axial overall length which corresponds to the percentage of the axial overall length of the steering rod which is supported by the sliding bearing device.

It is thus one consideration of the invention to propose a steering axle which is distinguished by particularly stable support of the steering rod, wherein any loads which occur can be distributed particularly well by virtue of the elongate support for the steering rod.

In another preferred implementation, it is envisaged that the steering axle is accommodated with a small radial clearance in the sliding bearing device. In particular, the steering rod is arranged in the sliding bearing device in such a way that, in a no-load state, the steering rod is spaced apart slightly from the sliding bearing device and, in a loaded state, is supported in some section or sections on the sliding bearing device. As a particular preference, a uniform gap, in particular an annular gap, is formed between the sliding bearing device and the steering rod in a no-load state. In particular, the steering rod is arranged with a radial clearance of less than 1 mm, preferably less than 0.5 mm, more specifically less than 0.1 mm, relative to the sliding bearing device. Alternatively or as an optional additional measure, the steering rod is arranged with a radial clearance of more than 0.05 mm, preferably more than 0.25 mm, more specifically more than 0.75 mm, relative to the sliding bearing device.

It is thus one consideration of the invention to propose a steering axle which is distinguished, especially at low loads, by particularly smooth guidance of the steering rod, while, at the same time, only very slight deformation of the steering rod is permissible at higher loads.

In another preferred specific embodiment, it is envisaged that the actuator housing has a first and a second housing section, wherein the steering rod is supported on at least one or precisely one of the two housing sections via the sliding bearing device. In particular, the first and the second housing section are designed as two separate housing parts, which are connected to one another positively and/or nonpositively and/or frictionally and/or materially. The two housing sections can be designed as two half shells, which are supported on one another in the radial or in the axial direction in relation to the main axis. In particular, at least one of the two housing sections has the guide section. Alternatively, however, it is also possible for the two housing sections to define the guide section jointly. More specifically, both housing sections each have a guide section, wherein one or both guide sections receives a respective sliding bearing device. The two housing sections preferably jointly define a housing interior, in particular a cylindrical housing interior, wherein the steering rod is guided at least partially by the two housing sections, in particular the housing interior, in the axial direction in relation to the main axis. The first and/or the second housing section are preferably arranged coaxially with one another in relation to the main axis.

In another preferred embodiment of the invention, it is proposed that the steering actuator has an electric motor and a transmission device. The electric motor can be arranged and/or aligned coaxially and/or concentrically and/or radially and/or axially parallel with respect to the steering rod in relation to the main axis. In order to transmit the steering movement, the electric motor is connected in terms of transmission to the steering rod via the transmission device. In particular, the electric motor is connected in terms of transmission to the steering rod via at least one or precisely one transmission stage. At least the transmission device is preferably arranged in the actuator housing. In particular, the transmission device is accommodated in the first and/or the second housing section. In principle, the transmission device is designed, for example, as a bevel wheel transmission or a worm gear, thus enabling the electric motor to be arranged at an angle to the steering rod and/or lengthwise with respect to the direction of travel of the industrial truck. As an alternative, the transmission device can be designed as a spur gear mechanism, for example. Thus, the electric motor can be aligned parallel to the steering rod and/or transversely to the direction of travel of the industrial truck.

In another preferred embodiment, it is envisaged that the steering rod is designed as a threaded spindle. In particular, the steering rod has a ball screw thread or a trapezoidal thread or the like as the threaded section. The transmission device has a spindle nut, which is in engagement with the threaded section of the steering rod designed as a threaded spindle. In particular, the spindle nut is arranged coaxially and/or concentrically with respect to the steering rod. As an option, a plurality of rolling elements, in particular balls, can be arranged between the steering rod and the threaded spindle. The electric motor is connected to the spindle nut in terms of transmission, wherein, during transmission of the steering movement by the electric motor, the spindle nut is rotated around the main axis, with the result that a translational movement of the steering rod is performed and the two wheel carriers are pivoted.

In a preferred specific embodiment, it is envisaged that a first steering rod section of the steering rod is supported on one of the two housing sections in the radial direction via the sliding bearing device. In particular, the housing section has the guide section, wherein the first steering rod section is a section of the steering rod which is guided by the guide section. A second steering rod section is supported on the other housing section in the radial direction via the spindle nut. Alternatively or as an optional additional measure, the second steering rod section is supported on the other housing section in the radial direction via a further sliding bearing device, in particular a further guide section. In particular, the second steering rod section is a section of the steering rod which is guided by the spindle nut and/or the further guide section.

It is thus one consideration of the invention to propose a steering axle which is distinguished by multiple support of the steering rod on the actuator housing.

Another subject of the invention relates to an industrial truck having the steering axle as already described above. The industrial truck is designed as a four-wheel forklift truck. In particular, electromechanical steering is implemented by the steering axle. In the case of the proposed electrically actuated steering of the steering axle, the steering movements can preferably be implemented by the electric motor.

BRIEF DESCRIPTION OF THE DRAWINGS

Further features, advantages and effects of the invention will emerge from the following description of preferred illustrative embodiments of the invention. In the drawing.

DETAILED DESCRIPTION OF THE PREFERRED EMBODIMENTS

Figure 1:
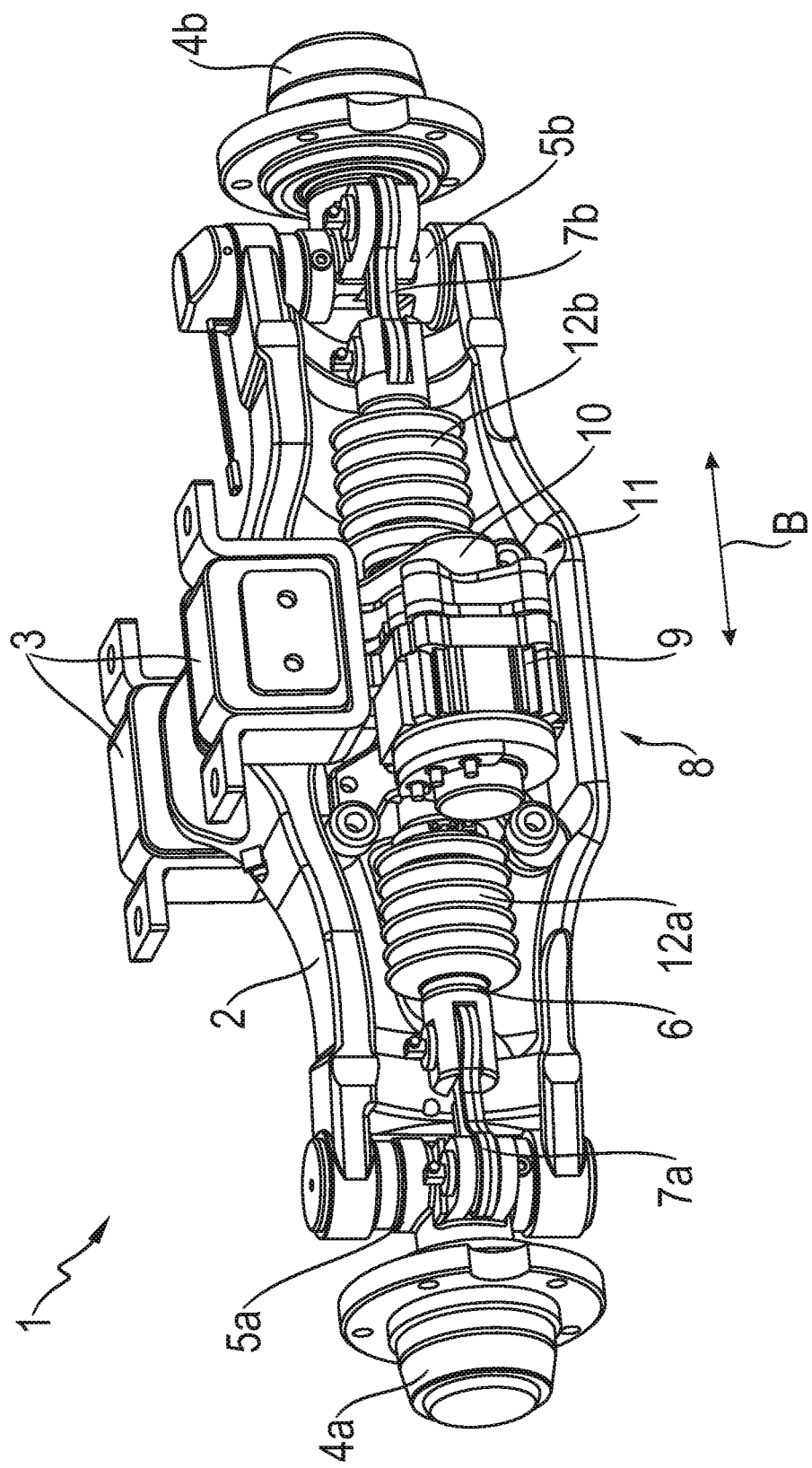
FIG. 1 shows a three-dimensional illustration of a steering axle as one illustrative embodiment of the invention.

FIG. 1 shows a three-dimensional illustration of a steering axle 1 for an industrial truck as one illustrative embodiment of the invention. The industrial truck is designed as a four-wheel forklift truck, for example, wherein the steering axle 1 forms a steered rear axle of the four-wheel forklift truck.

The steering axle 1 has an axle beam 2, which forms a rigid part of the steering axle 1 and can be connected firmly to a frame of the industrial truck. For this purpose, the axle beam 2 has a fastening section 3, wherein the fastening section 3 can be connected to the frame of the industrial truck by means of a screwed joint, for example. Arranged at each of the two ends of the axle beam 2 is a respective wheel carrier 4a, b, which is in each case fixed pivotably on the axle beam 2 by means of a pivot joint 5a, b. The two wheel carriers 4a, b each serve to receive a vehicle wheel (not illustrated) of the industrial truck.

To transmit steering movement B, the steering axle 1 has a steering rod 6, wherein the steering rod 6 connects the two wheel carriers 4a, b to one another in articulated fashion. For this purpose, the two wheel carriers 4a, b are each connected in articulated fashion to one axial end of the steering rod 6 by means of a steering arm 7a, b. To transmit the steering movement B, the steering rod 6 can be moved in translation between the two wheel carriers 4a, b, wherein the translational steering movement B is converted by means of the steering arms 7a, b and the respectively associated pivot joint 5a, b into rotary steering movements of the two wheel carriers 4a, b about the respective pivot joint 5a, b.

To produce the steering movement B, the steering axle 1 has a steering actuator 8, wherein the steering actuator 8 is coupled to the steering rod 6 in terms of drive. The steering actuator 8 comprises an electric motor 9 and a transmission device 10, wherein the electric motor 9 is coupled to the steering rod 6 in terms of transmission by means of the transmission device 10. Electromechanical steering of the steering axle 1 is thus achieved by means of the steering actuator 8.

The steering actuator 8 has an actuator housing 11, which is used to accommodate the electric motor 9 and the transmission device 10. The actuator housing 11 is arranged centrally between the two wheel carriers 4a, b. The transmission device 10 is arranged within the actuator housing 11, wherein the electric motor 9 is mounted externally on the actuator housing 11 and projects at least partially into the actuator housing 11, e.g. by means of a motor shaft, for coupling to the transmission device 10. The steering rod 6 is guided by the actuator housing 11, wherein the steering rod 6 projects from each end of the actuator housing 11 and is connected to the wheel carriers 4a, b. To protect the steering rod, a respective boot 12a, b is arranged on each side of the actuator housing 11, said boot being connected, on the one hand, to the actuator housing 11 and, on the other hand, to one end of the steering rod 6. The actuator housing 11 is arranged in the axle beam 2 and can be connected detachably for example, e.g. by means of a screw joint, to the axle beam 2.

Figure 2:
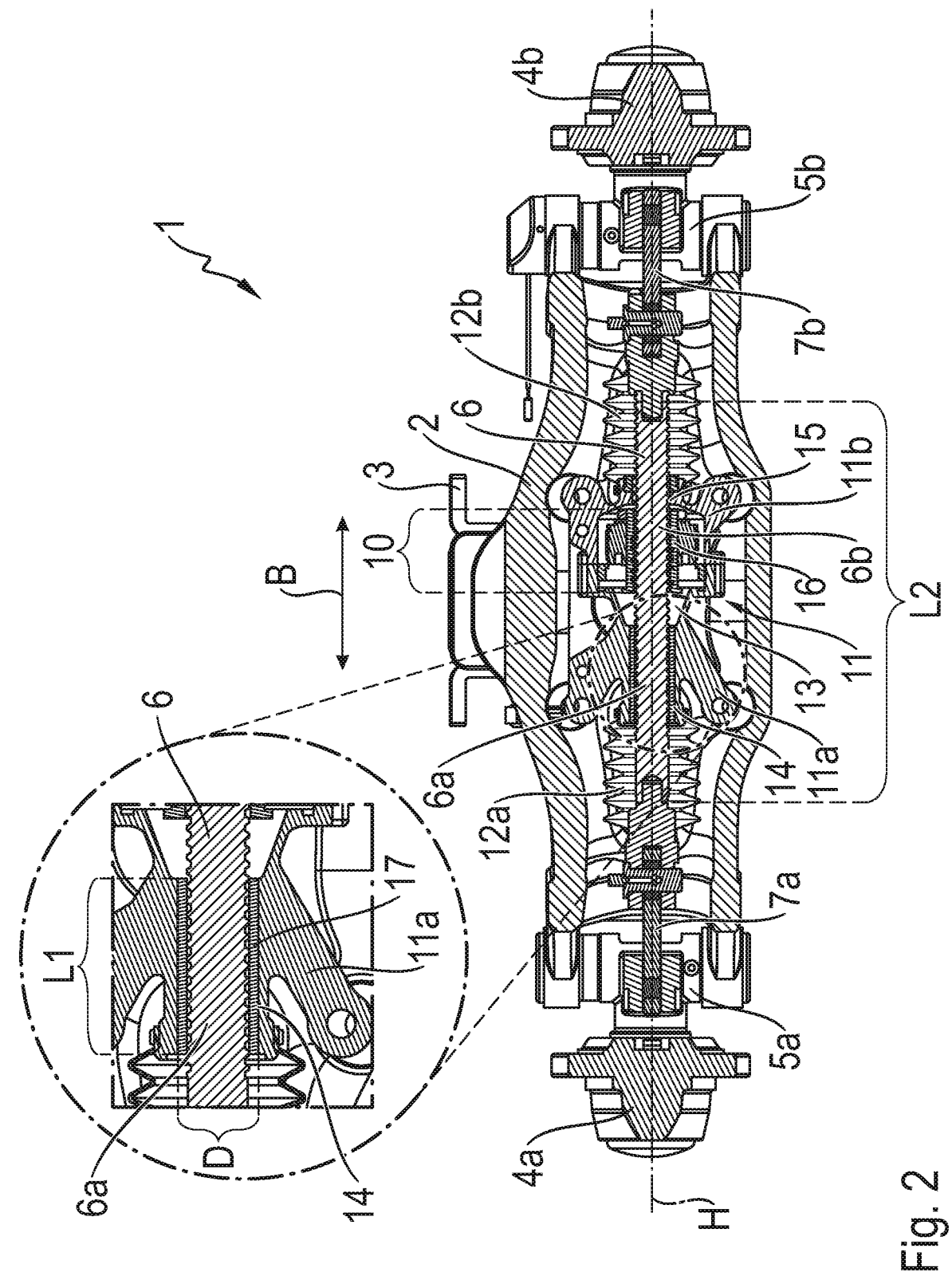
FIG. 2 shows a sectional illustration of the steering axle from FIG. 1.

FIG. 2 shows a longitudinal section through the steering axle 1 along a main axis H. The main axis H is defined by a longitudinal axis of the axle beam 2, for example. The actuator housing 11 is of two-part design and has a first and a second housing section 11a, b. Roughly speaking, the two housing sections 11a, b are of at least approximately hollow-cylindrical design and jointly form a housing interior 13. The two housing sections 11a, b rest against one another in the axial direction in relation to the main axis H and/or make contact with one another in a radial plane of the main axis H. The two housing sections 11a, b can be screwed to one another in the axial direction in relation to the main axis H, for example.

The first housing section 11a has a guide section 14, and the second housing section 11b has a further guide section 15, wherein the steering rod 6 is guided by the actuator housing 11 in the axial direction in relation to the main axis H by means of the two guide sections 14, 15. The two guide sections 14, 15 are arranged coaxially with one another in relation to the main axis H, wherein the two guide sections 14, 15 are each designed as a through-hole aligned axially with respect to the main axis H, for example.

To transmit the steering movement B to the steering rod 6, the transmission device 10 has a spindle nut 16, wherein the steering rod 6 is designed as a threaded spindle. The spindle nut 16 is arranged coaxially and/or concentrically with the steering rod 6, wherein the spindle nut 16 and the steering rod 6 are in engagement with one another. For example, the steering rod 6 designed as a threaded spindle has a ball screw, wherein a plurality of balls is arranged between the spindle nut 16 and the steering rod 6. The electric motor 9 can be coupled to the spindle nut 16 by means of at least one or precisely one transmission stage. To implement the steering movement B, the electric motor 9 turns the spindle nut 16 around the main axis H, wherein the steering rod 4 performs the translational steering movement B, in particular in the axial direction in relation to the main axis H, and the two wheel carriers 4a, b are pivoted around the respectively associated pivot joint 5a, b.

During the implementation of the steering movement B, transverse forces arise which act on the steering rod 6 and lead to deformation, in particular bending, of the steering rod 6. To reduce this deformation, the steering actuator 11 has a sliding bearing device 17, which is used for the radial support of the steering rod 6 in the guide section 14. The sliding bearing device 17 is designed as a cylindrical slide bush, wherein the sliding bearing device 17 is accommodated with positive engagement in the guide section 17 in the radial direction in relation to the main axis H. For this purpose, the sliding bearing device 17 rests over an area, in particular over the full area, of an outer lateral surface on an inner circumference of the guide section 14. The sliding bearing device 17 is pressed into the guide section 14, for example, thus ensuring that the sliding bearing device 17 is secured against loss. The sliding bearing device 17 has an elongated shape, wherein an axial overall length L1 of the sliding bearing device 17 is at least twice as great as the diameter D thereof. In particular, the sliding bearing device 17 has an axial length L1 which corresponds to 25% of an axial overall length L2 of the steering rod 6, for example.

A first steering rod section 6a of the steering rod 6 is passed axially through the sliding bearing device 17, wherein the first steering rod section 6a is spaced apart with a small clearance, e.g. less than 0.3 mm, from the sliding bearing device 17. A second steering rod section 6b of the steering rod 6 is passed through the spindle nut 16 and the further guide section 15. When the steering rod 6 is subjected to a load, in particular by transverse forces, the steering rod 6 is supported on the sliding bearing device 17 in the radial direction at least by means of the first steering rod section 6a. By means of sliding bearing support, e.g. by dry lubrication, implemented between the sliding bearing device 17 and the steering rod 6, a smooth steering movement B of the steering rod 6 in the axial direction in relation to the main axis H is furthermore made possible. Owing to the small clearance between the first steering rod section 6a and the sliding bearing device 14, the deformation, in particular the bending, of the steering rod 6 is significantly reduced, thus increasing the life of the steering rod 6 and thus of the steering axle 1. Moreover, loads acting on the steering actuator 8 can be significantly reduced, thus improving the operational reliability of the steering actuator 8.

REFERENCE SIGNS 1 steering axle
2 axle beam
3 fastening section
4a, b wheel carrier
5a, b pivot joint
6 steering rod
7a, b pivot arm
8 steering actuator
9 electric motor
10 transmission device
11 actuator housing
12a, b boot
13 housing interior
14 guide section
15 further guide section
16 spindle nut
sliding 17 bearing device
B steering movement
H main axis
D diameter
L1 axial overall length (sliding bearing device)
L2 axial overall length (steering rod)

The invention claimed is:

1. A steering axle for an industrial truck, the steering axle comprising:
   an axle beam defining a main axis,
   first and second wheel carriers being pivotably mounted on the axle beam,
   a steering rod being connected, in articulated fashion, to the first and the second wheel carriers to transmit a steering movement thereto, the steering rod being coaxially aligned with the axle beam along the main axis,
   a steering actuator for producing the steering movement, the steering actuator having an actuator housing, and the actuator housing having at least one guide section for passage of the steering rod through the actuator housing, and
   the steering actuator having at least a first sliding bearing device for radially supporting the steering rod on the at least one guide section.

2. The steering axle according to claim 1, wherein the first sliding bearing device is designed as a slide bush, and the slide bush is arranged coaxially in the guide section in relation to the main axis.

3. The steering axle according to claim 1, wherein the first sliding bearing device is arranged in the guide section (14) in a manner secure against loss by at least one of a positive and a non-positive joint.

4. The steering axle according to claim 1, wherein the steering rod has an axial overall length (L2), and at least 10% of the axial overall length of the steering rod is supported by the first sliding bearing device.

5. The steering axle according to claim 1, wherein the steering rod is accommodated in the first sliding bearing device with a radial clearance such that the steering rod is spaced from the first sliding bearing device by an annular gap.

6. The steering axle according to claim 1, wherein the actuator housing has first and second housing sections, and the steering rod is supported on at least one of the first and the second housing sections via the first sliding bearing device.

7. The steering axle according to claim 1, wherein the steering actuator has an electric motor and a transmission device, at least the transmission device is arranged in the actuator housing, and the electric motor is connected in terms of transmission to the steering rod by the transmission device to transmit the steering movement.

8. The steering axle according to claim 7, wherein the steering rod is designed as a threaded spindle, and the transmission device has a spindle nut which is in engagement with the steering rod designed as the threaded spindle.

9. The steering axle according to claim 8, wherein a first steering rod section of the steering rod is supported on one of two housing sections of the actuator housing in a radial direction via the first sliding bearing device, and a second steering rod section is supported on the other housing section of the two housing sections in the radial direction via at least one of the spindle nut and via a further sliding bearing device.

10. An industrial truck having the steering axle according to claim 1, wherein the industrial truck is designed as a four-wheel forklift truck.

11. A steering axle for an industrial truck, the steering axle comprising:

an axle beam defining a main axis, first and second wheel carriers, the first wheel carrier being pivotably fixed to one axial end of the axle beam and the second wheel carrier being pivotably fixed to an opposite axial end of the axle beam, a steering rod being articulatably connected to the first and the second wheel carriers to transmit steering movement to the first and the second wheel carriers, the steering rod being coaxially aligned with the axle beam along the main axis, and a steering actuator for producing the steering movement, the steering actuator having an actuator housing, and the actuator housing having first and second guide sections that guide the steering rod through respective axially opposite sides of the actuator housing, the steering actuator having at least one sliding bearing device that is received within the first guide section and radially supporting the steering rod in the first guide section such that the steering rod is axially slidable relative to the actuator housing.

* * * * *